(12) United States Patent
Nhaissi

(10) Patent No.: US 6,381,315 B1
(45) Date of Patent: Apr. 30, 2002

(54) UNIVERSAL EXCHANGE FOR MAKING LEAST-COST NON-LOCAL TELEPHONE CALLS

(76) Inventor: Eli Nhaissi, 6 Coachmans Ct., Old Westbury, NY (US) 11568

( * ) Notice: Subject to any disclaimer, the term of this patent is extended or adjusted under 35 U.S.C. 154(b) by 0 days.

(21) Appl. No.: 09/452,703

(22) Filed: Dec. 2, 1999

(51) Int. Cl.[7] .................. H04M 15/00; H04M 17/00; H04M 7/00

(52) U.S. Cl. .............. 379/111; 379/114.02; 379/114.26; 379/115.02; 379/115.03; 379/127.03; 379/202; 379/221.01

(58) Field of Search ................................. 379/112, 114, 379/115, 121, 127, 144, 202, 207, 220, 221; 455/405, 406, 407, 408

(56) References Cited

U.S. PATENT DOCUMENTS

| | | | |
|---|---|---|---|
| 3,652,795 A | 3/1972 | Wolf et al. ..................... 179/2 |
| 3,676,597 A | 7/1972 | Peterson ........................ 179/6.3 |
| 3,938,091 A | 2/1976 | Atalla et al. ................. 340/149 |
| 4,162,377 A | 7/1979 | Mearns ......................... 179/18 |
| 4,332,985 A | 6/1982 | Samuel ......................... 179/90 |
| 4,410,765 A | 10/1983 | Hestad et al. ................ 179/7.1 |
| 4,439,636 A | 3/1984 | Newkirk et al. ............. 179/7.1 |
| 4,506,116 A | 3/1985 | Genest ......................... 179/90 |
| 4,595,983 A | 6/1986 | Gehalo et al. .............. 364/401 |
| 4,698,752 A | 10/1987 | Goldstein et al. .......... 364/200 |
| 4,706,275 A * | 11/1987 | Kamil ........................ 379/144 |
| 4,897,870 A | 1/1990 | Golden ........................ 379/144 |
| 5,420,914 A * | 5/1995 | Blumhardt .................. 379/114 |
| 5,508,999 A * | 4/1996 | Cox, Jr. et al. .............. 370/17 |
| 5,515,425 A * | 5/1996 | Penzias et al. ............... 379/114 |
| 5,621,787 A * | 4/1997 | McKoy et al. ............... 379/144 |
| 5,781,620 A * | 7/1998 | Montgomery et al. ....... 379/115 |
| 5,862,203 A * | 1/1999 | Wulkan et al. .............. 379/114 |
| 6,195,422 B1 * | 2/2001 | Jones et al. ................. 379/144 |
| 6,205,211 B1 * | 3/2001 | Thomas et al. ............. 379/114 |
| 6,208,851 B1 * | 3/2001 | Hanson ....................... 455/405 |

FOREIGN PATENT DOCUMENTS

| | | |
|---|---|---|
| EP | 0048868 | 9/1981 |
| EP | 0088639 | 3/1983 |
| FR | 2575-016 A | 12/1984 |
| GB | 1544542 | 4/1976 |
| GB | 2046556 A | 11/1980 |
| GB | 2141309 A | 12/1984 |
| GB | 2171877 B | 9/1986 |
| JP | 47-20882 | 10/1972 |

(List continued on next page.)

OTHER PUBLICATIONS

AT&T "Notes on the BOC Intra–Lata Networks", p. 14, 1983.
U.K. Search Report dated Feb. 21, 1986.

Primary Examiner—Binh Tieu
(74) Attorney, Agent, or Firm—Ostrager Chong & Flaherty LLP

(57) ABSTRACT

A method and an apparatus for making least-cost non-local telephone calls. In accordance with this method, an identification code of a customer and a plurality of carrier codes associated with the identification code are stored in a memory which is accessible by a computer at a universal exchange. Each carrier code identifies a respective one of a plurality of telephone call carriers. Subsequent to the storing step, the universal exchange receives the customer identification code and a destination telephone number by means of a telephone call from the customer. The computer at the universal exchange processes the destination telephone number and the plurality of carrier codes corresponding to the customer identification code in accordance with respective rate schedules for those carriers and a least-cost routing algorithm, thereby determining a least-cost carrier for connecting the customer to the station identified by the destination telephone number. The computer then controls a telephone switching matrix to route the telephone call to an exchange of the least-cost carrier.

57 Claims, 1 Drawing Sheet

FOREIGN PATENT DOCUMENTS

| | | |
|---|---|---|
| JP | 48-90110 | 11/1973 |
| JP | 53-39808 | 4/1978 |
| JP | 53-132919 | 11/1978 |
| JP | 58-3367 | 1/1983 |
| JP | 58-165473 | 9/1983 |
| JP | 2997709 | 11/1999 |
| WO | 84/01073 | 3/1984 |
| WO | 87/02208 | 4/1987 |

* cited by examiner

UNIVERSAL EXCHANGE FOR MAKING LEAST-COST NON-LOCAL TELEPHONE CALLS

FIELD OF THE INVENTION

This invention generally relates to telephone systems. In particular, the invention relates to telephone systems for making prepaid or post-paid long-distance and international telephone calls.

BACKGROUND OF THE INVENTION

Private telephones located at residences or businesses typically are billed on a monthly basis by the local and long-distance carriers. Wireless telephones are also available on the same basis, provided that the customer is able to meet various standards of credit-worthiness. People can also use public telephones by depositing coins, charging the call to a credit card, or charging the call to a different telephone number using telephone debit cards.

An alternative method of paying for phone calls, which is becoming increasingly prevalent, is to provide prepaying customers with a special code or PIN number which can be used (provided that the prepayment has not been exhausted) at any time to make a phone call. The telephone service is provided by the telephone carrier to whom the prepayment was made. As used herein, the term "prepaid telephone system" means a system in which each prepaying customer is given a unique special code for use in making telephone calls until the prepayment has been exhausted.

A prepaid telephone system and a method for making prepaid telephone calls are disclosed in U.S. Pat. No. 4,706,275 issued to Zvi Kamil. The method comprises the steps of: obtaining a special code by making a prepayment; storing the special code and associated prepayment amount in a memory in a special exchange; connecting to the special exchange when a telephone call connection is desired; transmitting the special code and the number of the called party to the special exchange; verifying that the special code is valid and that the available credit is sufficient to cover the initial cost of the call; connecting the calling party station to the called party station in response to verification; and disconnecting the call when the available credit has been spent. The "special exchange" referred to in U.S. Pat. No. 4,706,275 is a telephone switching matrix having an associated computer and memory for performing the special functions of verifying and monitoring prepaid telephone calls. The prepaid customers can connect to the special exchange via either a wire (land) line or a wireless connection. The term "special exchange" will be used in the same sense herein.

The method disclosed in U.S. Pat. No. 4,706,275 has been widely adopted in the telephone industry. Generally, each prepaid carrier has its own special exchange to which its prepaid customers are able to connect. Initially, the prevailing application of the teaching of U.S. Pat. No. 4,706,275 was in the context of public telephone connected to a special exchange via a land line. In recent years the teaching of U.S. Pat. No. 4,706,275 has been widely adopted by wireless carriers.

In the typical land-line prepaid telephone system, the customer purchases a prepaid telephone card which has a special code, also known as a PIN number, printed on the back of the card. Typically the PIN number is obscured by a layer of opaque material which is removed after purchase to reveal the secret PIN number to the cardholder. The prepaid telephone card also have one or more access phone numbers printed thereon. At the time of card purchase, the PIN number and prepayment amount (i.e., value of the card purchased) are recorded by the card issuer and then forwarded to the service provider for storage in computer memory at a special exchange operated by the prepaid telephone service provider. When the customer wishes to make a prepaid telephone call, he/she first dials the access phone number to connect to the special exchange. When the connection is made, the customer is prompted by a computer to enter the PIN number and the destination phone number. The special exchange then determines whether the call should be connected by verifying that the PIN number is valid and that sufficient prepaid balance is available to cover the cost of the call to the destination phone number. If the PIN number is valid and the available balance is sufficient, the call is connected. The running cost of the call is monitored, either by computing the running cost or by calculating the airtime available (based on the charge per minute and the available balance) and then subtracting the call duration from the available airtime. When the available balance/available airtime has been exhausted, the telephone call is disconnected.

The technique for making a prepaid wireless telephone call differs somewhat from the land-line technique. In one type of prepaid cellular (wireless) telephone system, a predetermined amount of airtime may be purchased at the time when the handset is purchased. At the time of the transaction, the purchaser is given a multi-digit Electronic Serial Number (ESN) and a multi-digit purchase identification number (PIN). The ESN, which is imprinted on a plate affixed to the inside of the handset, uniquely identifies that handset. The PIN number merely identifies the particular transaction by which airtime was purchased. After leaving the store with the handset and PIN number, the purchaser may call the central office of the wireless carrier to activate the cellular telephone. At that time, the handset purchased by the pre-paid customer is assigned a 10-digit telephone number, also known as the Mobile Identification Number (MIN), which uniquely identifies that handset. The activated handset will respond to that MIN and will also transmit that MIN along with the ESN when a call is being made from that handset.

The fundamental difference between prepaid and non-prepaid cellular telephone systems is the requirement that the prepaid system only connect the desired call if a certain minimum prepaid credit amount (associated with the particular handset being used) is available. One type of prepaid cellular telephone system employs a prepaid platform comprising a switching matrix, memory for storing MINs and prepaid credit amounts, and a computer (e.g., a central processing unit) for controlling the switches of the switching matrix in dependence on whether a particular MIN of a calling party is valid and whether the required prepaid amount of credit is available, both of which pieces of information are stored in memory and retrieved by the computer of the prepaid platform.

The prepaid platform for performing the verification and monitoring functions may be situated on the same premises as the wireless carrier's central switching system, hereinafter "mobile telephone switching office" (MTSO), or may be situated away from the MTSO. In either case, the MTSO computer is connected to the prepaid platform computer via a communications link. For example, the prepaid platform may interface with the MTSO via a T1 communications link. Alternatively, the same computer may perform the functions of both the MTSO and the prepaid platform. In the subsequent description of the functionality of an exemplary cellular telephone exchange comprising an MTSO and a prepaid platform, it should be understood that the respective functions being described can be performed by a single processor having sufficient computing power, rather than by two processors connected by a communications link.

In one example of a prepaid cellular telephone system, the ESN and MIN are stored in the MTSO's computer memory at the time of handset activation. Also, the MIN and the prepaid amount of airtime/credit are stored in the computer memory of the prepaid platform. When the handset user wishes to make a phone call, the user enters the destination phone number (including the area code if necessary) he wishes to call and then presses the TALK button. When the TALK button is depressed, the ESN, the MIN and the destination phone number are transmitted by the handset in the form of radiofrequency signals. These radio signals are received by the nearest cellular telephone tower, which relays the ESN, MIN and destination phone number to the MTSO, also by transmitting radiofrequency signals. The receiver at the MTSO receives the transmitted signals from the cell tower, which signals carry the ESN, MIN and destination phone number. The computer at the MTSO first matches the ESN to the MIN to ensure against fraud. This is done by comparing the incoming ESN and MIN with the corresponding pair stored in computer memory at the MTSO. If the ESN matches the MIN, the MTSO then determines whether the MIN identifies a prepaid customer. If the determination is affirmative, the MTSO computer hands the call of f to the prepaid platform via the communications link.

In response to receipt of the MIN and the destination phone number, the computer at the prepaid platform verifies that the MIN is valid and checks the available prepaid credit balance associated with the transmitted MIN to make sure that sufficient credit is available to cover the initial cost of the requested telephone call. These verifications are carried out by comparing the received numbers with the corresponding numbers stored in the prepaid platform memory. If there is sufficient credit available, the prepaid platform computer hands the call back to the MTSO via the communications link. The MTSO computer then initiates operation of the appropriate switches needed to route the cellular telephone call to the destination phone number. Alternatively, if the prepaid platform has its own telephone switching matrix, the prepaid platform can route the call through its own switches.

Upon establishment of a connection between the handset user and the called party, the prepaid platform monitors the call. If the prepaid credit balance is exhausted before the handset user disconnects the call, the prepaid platform initiates disconnection of the call. Then the prepaid platform computer will decrement the available credit balance by the cost of the completed telephone call.

In another type of prepaid cellular telephone system, a cell phone user can prepay for airtime by purchasing a prepaid telephone card from a prepaid carrier different than the wireless carrier from whom the cell phone user has purchased the handset. That prepaid carrier has a special exchange which the cell phone user can access by dialing a special access code, e.g., *999, on his handset. The wireless carrier then forwards the wireless call to the special exchange of the prepaid carrier. Once the connection is made, the cell phone user must input the PIN number which appears on the prepaid telephone card. If the PIN number is valid and if a sufficient amount of prepaid credit is available on that card, the prepaid carrier will route the cell phone user to the station corresponding to the destination telephone number inputted by the user.

Prepaid cellular telephones are ideally suited for persons having a credit rating which falls short of the standard set by a particular wireless carrier as a precondition for purchase of a non-prepaid cellular telephone. One problem, however, is the high cost to the consumer of wireless telephone services and the great variability in the costs charged by different wireless carriers. The carriers that sell prepaid or postpaid wireless telephone service are the providers of the local, long distance or international service. Once a consumer buys a handset and prepaid or postpaid wireless service from a particular carrier, that carrier is the one that generally provides the network service. To the extent that a consumer believes they are captive to the carrier providing local wireless service, that wireless carrier is able to charge above-market rates for long-distance and international telephone service. Although land-line telephone service is generally cheaper than wireless telephone, land-line telephone service providers also charge at rates which vary widely and which may include hidden charges over and above the simple cost per minute charge.

Today any customer that uses prepaid or postpaid wireless or land-line telephone service can buy prepaid land line usage, a prepaid telephone card, or a prepaid dial tone from any vendor carrier for use with any telephone by dialing a toll-free number or dialing directly to the special exchange of that carrier. In the case of land-line telephones, when the customer is connected to that special exchange, he/she is asked to transmit his/her special code number. In the case of wireless telephones, the wireless telephone transmits its MIN number, which serves the function of a special code or PIN number for verifying an authorized prepaid customer. After the special code and credit available have been verified by the special exchange corresponding, e.g., to the land-line prepaid telephone card being used by the customer, the customer can make long-distance and international telephone calls through that special exchange.

Any person has the freedom to select which carrier to purchase prepaid telephone service from. A person may even purchase multiple prepaid telephone calling cards from multiple prepaid service providers. However, in the latter case, it would be extremely inconvenient and time consuming for each consumer to monitor the telephone rates of different prepaid telephone service providers in order to identify the least-cost provider. This is particularly the case where there is a wide disparity in the methods used to compute telephone charges. Even more daunting is the fact that each international telephone service provider charges different rates for calls to different countries. The charges for placing a call from the United States to a particular country may vary widely from carrier to carrier. This is also true of the telephone rates applicable to post-paid long-distance and international telephone service.

Thus there is a need for a method and a system of automatically routing long-distance and international telephone calls to the least-cost carrier in the situation where a consumer is buying long-distance and/or international telephone service from multiple carriers. This need is especially great in the prepaid wireless telephone market, where the carrier who sells the handset and associated prepaid wireless telephone service to the consumer may charge low rates for local telephone service and high long-distance and/or international rates. Such a prepaid wireless carrier has no incentive to help the consumer to buy long-distance and/or international service from its competitors.

SUMMARY OF THE INVENTION

The present invention is a method and an apparatus for enabling a consumer to buy long-distance and/or international telephone service at the least cost from any one of a multiplicity of alternative carriers. The invention has application in both prepaid and post-paid telephone systems. In addition, the consumer may make the call from a wireless handset or from telephony equipment connected to a land line. In accordance with the preferred embodiment of the invention, a consumer wishing to make a long-distance or international call may connect to a universal exchange via a wireless or land-line telephone and then be routed by the universal exchange to the least-cost carrier for that particular call. In the case of wireless telephones, the invention will enable the consumer to buy the wireless handset and associated local wireless prepaid or postpaid telephone service from a wireless carrier, while the consumer will be able to buy non-local telephone service from a least-cost carrier selected from a list of long-distance and/or international carriers with which that particular consumer is doing business. In the case of land-line telephones, the invention will enable the consumer to purchase the associated local land-line prepaid or postpaid telephone service, while the consumer will again be able to buy non-local telephone service from a least-cost carrier selected from a list of long-distance and/or international carriers with which that particular consumer is doing business. The non-local portion of the call can be executed by the long-distance/international carrier through the most competitive means, such as the Internet, telephone line, satellite or microwave communications, optical fibers, television cable, copper wire, etc., or through other wireless carriers.

The invention allows a consumer to avoid excessive telephone charges and obtain the most economic long-distance and/or international telephone service. Heretofore, least-cost routing has been used by carriers to decrease their operating costs, but has not been made available to the consumer, In the case of pre-paid cellular telephone service, the invention allows the consumer to buy a handset from a particular wireless carrier and use the same wireless carrier mainly for local wireless calls, while buying long-distance and international telephone service at the lowest possible price, i.e., by buying service on a prepaid or post-paid basis from multiple carriers that compete with each other for the consumer's business. These alternative carriers can be selectively used to make long-distance and/or international calls at rates which are cheaper than those being offered by the carrier from which the consumer purchased the handset. Although the consumer during, e.g., a long-distance call will be using two telephone services concurrently, i.e., the local carrier and the long-distance carrier, the difference in price between the long-distance rates charged by the local carrier and those charged by the long-distance carrier can be greater than the cost of the local wireless service during the long-distance call, resulting in an economic saving to the consumer.

In accordance with the preferred embodiment of the invention, if the consumer needs to make a prepaid non-local call, then the consumer will make a phone call to a smart exchange that will be referred to herein as a "universal exchange". This universal exchange, which may be owned by an independent carrier, will be connected to many participating carriers that provide prepaid or post-paid telephone service. Each carrier will be identified by the universal exchange with a unique carrier code having, e.g., one to five digits. In accordance with the preferred embodiment of the invention, the universal exchange receives and stores telephone rate information for each participating carrier. In addition, the universal exchange is programmed with a least-cost routing function which uses the stored telephone rate information to calculate the cost of a call for each available carrier and then identify the least-cost carrier for that call. Based on that determination, the universal exchange then routes the call to the exchange of that least-cost carrier.

For each customer of the universal exchange, the pool of available carriers will include those carriers participating with the universal exchange and from which the customer has purchased prepaid long-distance or international telephone service, e.g., prepaid telephone calling cards, and those participating long-distance/international carriers which the customers has accounts with. For each participating carrier, the universal exchange will assign a unique carrier code. The universal exchange will also assign a special identification code to each of its customers. In response to messaged requests from the universal exchange computer during an initialization procedure, the customer will provide the carrier codes for the multiple prepaid telephone calling cards and for the multiple telephone accounts held by that customer. This set of carrier codes received by the universal exchange must be associated with the customer identification code of that customer in the universal exchange memory. In the case of a customer who owns a wireless handset, the customer identification code recognized by the universal exchange can be the MIN for that particular handset. In the case of a customer who intends to make calls to the universal exchange from a residential or business telephone, the customer identification code recognized by the universal exchange can be the number for the telephone line to which that telephone is connected. In both of the foregoing cases, the universal exchange can utilize known "caller ID" technology to recognize the calling telephone number. Alternatively, the customer may select or be assigned a unique customer identification code different than his/her telephone number. In the case where the customer uses prepaid telephone calling cards only, the universal exchange customer may remain anonymous, being identified to the to the universal exchange by nothing more than a code or password.

After initialization, the universal exchange is ready to process any telephone call from the customer. For a particular telephone call, the universal exchange needs to receive only the customer identification code of the customer and the destination phone number. Based on the prestored list of carriers for which that particular customer is holding prepaid calling cards or has accounts and the associated rate schedules and based on the destination of the telephone call, the universal exchange identifies and routes the call to the exchange of the least-cost carrier. That exchange then processes the call. In the case of a pre-paid least-cost carrier, the exchange to which the call is routed will be a special exchange. In the case of a post-paid least-cost carrier, the exchange to which the call is routed will be a regular exchange. In addition to be able to connect to any participating carrier, it must be appreciated that once a customer has a subscription or account with the universal exchange, the customer can access the universal exchange from any telephoning means via any known telecommunications channel, whether it be a land-based telephone line or a wireless communications link.

In accordance with one preferred embodiment, if the least-cost carrier is a prepaid carrier, the special exchange of that least-cost prepaid carrier interacts directly with the customer once the call has been routed by the universal exchange. For example, before the call is routed by the special exchange of the least-cost prepaid carrier, that special exchange will ask the customer to enter his PIN number.

Then the special exchange will verify that prepaid credit corresponding to that PIN number is available. If the PIN number is valid and sufficient prepaid credit is available, the special exchange of the least-cost prepaid carrier will route the call to the station identified by the destination telephone number. On the other hand, if the least-cost carrier is a post-paid carrier, then the universal exchange routes the call to the regular exchange of that least-cost post-paid carrier, who will bill the customer's account accordingly.

In accordance with another preferred embodiment, the PIN numbers corresponding to the carrier codes of prepaid carriers are communicated to the universal exchange by the customer during the initialization procedure. These PIN numbers are stored with the corresponding carrier codes in memory at the universal exchange. Each PIN number identifies a respective prepayment transaction in which the customer has purchased future telephone service to be provided by a respective one of a plurality of prepaid carriers. After the universal exchange performs its least-cost routing routine and if a least-cost prepaid carrier has been identified, the universal exchange routes the call to the special exchange corresponding to the least-cost prepaid carrier, along with the corresponding PIN number. Then the special exchange of the least-cost prepaid carrier verifies the PIN number and associated available prepaid credit, and routes the call to the station identified by the destination telephone number. This embodiment has the advantage that the customer is relieved of the inconvenience of inputting the PIN number for each telephone call, but rather need input the PIN number only once, namely, during the initialization procedure.

A further preferred embodiment comprises a system and a method for routing a prepaid telephone call comprising the steps of: receiving a telephone call from a customer who has purchased prepaid airtime from a plurality of prepaid carriers; determining which prepaid carrier is the least-cost prepaid carrier for that telephone call; routing the telephone call to that least-cost prepaid carrier; receiving a message from the least-cost prepaid carrier indicating that the prepaid airtime purchased from that carrier by that customer is exhausted or nearly exhausted; and re-routing the telephone call to one of the other prepaid carriers, e.g., the second-lowest-cost prepaid carrier, in response to receipt of the message.

In accordance with an alternative preferred embodiment, the verification and monitoring functions performed by special exchanges may be performed by the universal exchange, which acts as a service bureau for the prepaid carriers. In this case, the customer must also input, e.g., via the telephone keypad, the PIN numbers during initialization. In addition, the PIN number and prepayment amount for each calling card must be received from all prepaid carriers served by the universal exchange. That information is stored in memory along with the corresponding carrier codes. If the universal exchange identifies a least-cost carrier from amongst the available prepaid carriers listed in memory for a particular customer, the universal exchange then uses the PIN number for the selected carrier, which PIN number was previously inputted by the customer, and matches that PIN number with a corresponding PIN number in the table of prepayment amounts. The universal exchange then verifies the available prepaid credit amount corresponding to the PIN number of the selected carrier, i.e., the least-cost routing routine excludes as least-cost carrier any carrier for which the available balance is insufficient to cover the initial cost of the telephone call to the station identified by the destination telephone number. If the customer has sufficient available prepaid credit with the selected least-cost carrier, the universal exchange routes the call to that least-cost carrier. Once the customer is connected to the station identified by the destination telephone number, the universal exchange can monitor the ongoing telephone call.

The foregoing method and system will enable the consumer to call any place in the world at the cheapest rate using least-cost routing amongst the different non-local carriers participating with the universal exchange and with which the customer has an account (in the case of post-paid telephone service) or a prepaid balance (in the case of prepaid telephone service).

In accordance with a further alternative preferred embodiment, the universal exchange monitors the quality of the connection made by the least-cost carrier. If the connection is unsatisfactory, e.g., because of diminished signal strength or excessive interference, the universal exchange can automatically re-route the call to the second-lowest-cost carrier.

In addition, the universal exchange enables a consumer to use one telephone line to connect to multiple parties for making a conference call. The universal exchange accomplishes this by routing calls to two or more conference participants via respective exchanges of carriers which the consumer is doing business with (prepaid or post-paid). Optionally, if the consumer has multiple prepaid PIN numbers with one carrier, the universal exchange can connect multiple parties for a conference call via multiple lines to the special exchange of that carrier. This can be accomplished using known conference-call switching technology in the universal exchange.

DETAILED DESCRIPTION OF THE PREFERRED EMBODIMENTS

Figure 1:
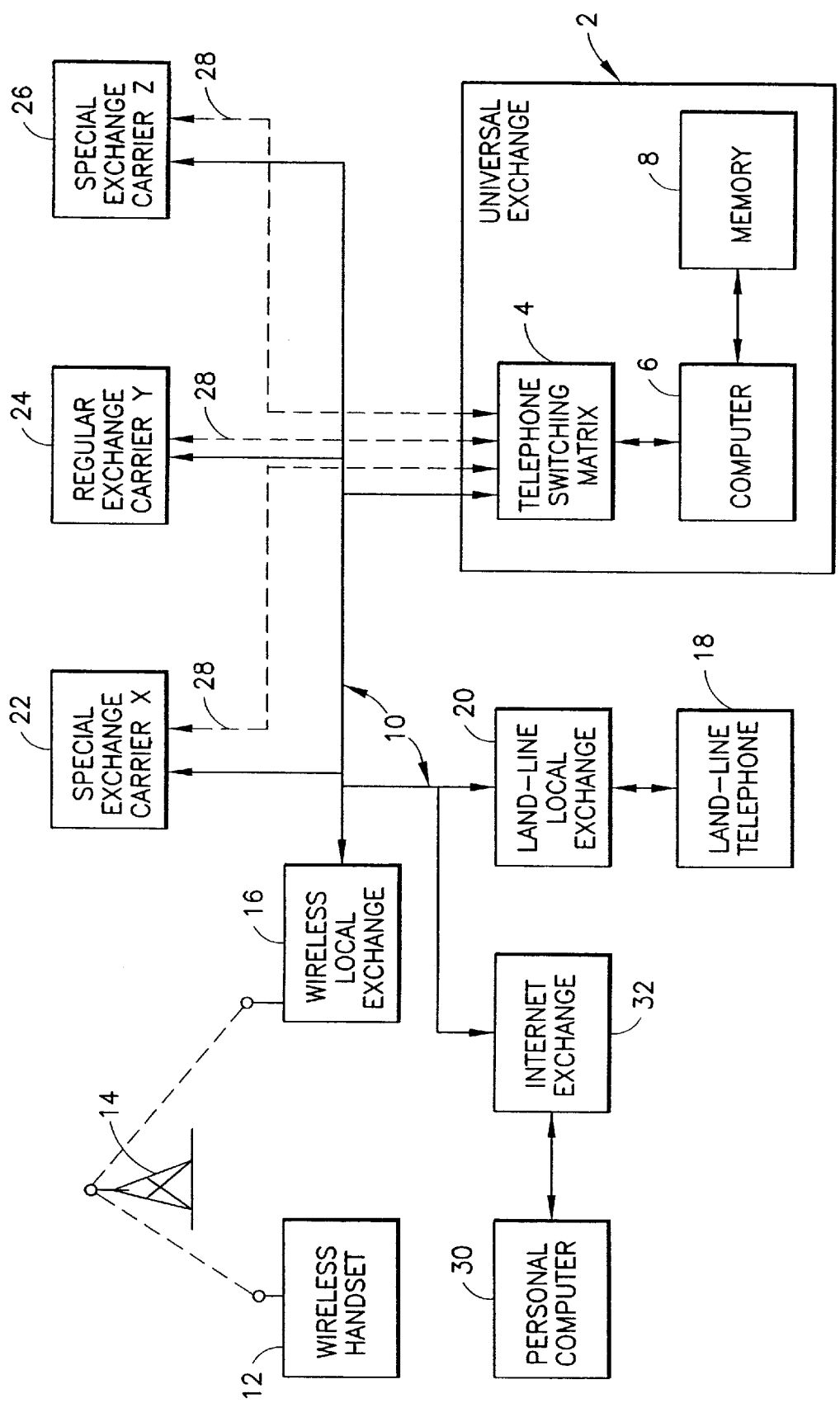
FIG. 1 is a block diagram showing a telephone system having a universal exchange in accordance with the preerred embodiment of the invention.

The preferred embodiment of the invention will be described with reference to FIG. 1. In FIG. 1, the universal exchange is represented by the block designated by reference numeral 2. The basic components of the universal exchange 2 include a telephone switching matrix 4 for routing telephone calls; a computer 6 for processing incoming telephone calls in accordance with a computer program stored in computer memory and sending control signals to the telephone switching matrix 4 for routing an incoming telephone call to the exchange of a preferred telephone carrier (prepaid or post-paid); and memory 8 for storing customer identification codes, a respective list of telephone carrier codes corresponding to each customer identification code, and a respective rate schedule corresponding to each telephone carrier code. It will be readily appreciated that some or all of memory 8 may be integrated into the computer 6.

The universal exchange 2 receives and distributes telephone calls via a public telephone system 10. The universal exchange can receive telephone calls from customers who use a wireless handset, a land-line telephone, a computer connected to the Internet, or any other type of telephoning apparatus. FIG. 1 shows a wireless handset 12 which can communicate with the universal exchange via a cell tower 14, a wireless local exchange 16 (prepaid and/or post-paid) and the public telephone system 10; a land-line telephone 18 which can communicate with the universal exchange via a land-line local exchange 20 and the public telephone system 10; and a personal computer 30 which can communicate with the universal exchange via a telephone exchange 32 of an Internet service provider and the public telephone system 10. Regardless of the telephoning means used by the customer, the customer accesses the universal exchange by inputting or dialing an access telephone number of the universal exchange. The access telephone number of the universal exchange will appear on the prepaid calling cards of prepaid carriers participating with the universal exchange. If the local service is prepaid, then the local exchange 16 will preferably be a special exchange of the type disclosed in U.S. Pat. No. 4,706,275.

In accordance with the preferred embodiment of the invention, the universal exchange 2 routes each incoming prepaid telephone call to the exchange of a preferred (e.g., least-cost) carrier, also via the public telephone system 10. Alternatively, the universal exchange could be connected to a particular exchange via dedicated telephone lines. For the purpose of illustration, FIG. 1 shows three exchanges 22, 24 and 26 operated by or on behalf of respective telephone carriers X, Y and Z. For the purpose of this example, exchanges 22 and 26 are special exchanges of the type disclosed in U.S. Pat. No. 4,706,275 and carriers X and Z are prepaid carriers, while exchange 24 is a regular exchange of a post-paid carrier Y. Each special exchange comprises a telephone switching matrix for routing incoming telephone calls, a computer for verifying and monitoring incoming telephone calls in the manner described in U.S. Pat. No. 4,706,275, and a memory for storing PIN numbers (i.e., special codes) and the respective amounts of prepaid credit associated with each PIN number. The regular exchange may be any known post-paid telephone exchange comprising a telephone switching matrix and suitable control means for routing calls through that matrix.

In accordance with a further aspect of the preferred embodiment, the universal exchange 2 interrogates each exchange 22, 24 and 26 and receives rate schedule information for each of carriers X, Y and Z via respective dedicated data lines 28. Preferably the universal exchange performs the interrogations at regular intervals, e.g., daily. Alternatively, the universal exchange may have an arrangement with a particular carrier that the latter will immediately advise the universal exchange (via a data line) of any changes in that carrier's rate schedule. Regardless of the protocol used to acquire the rate schedule information, the universal exchange stores that information in memory 8 for subsequent use by the computer 6 determining the least-cost carrier. The person skilled in the art of voice and data communications will readily appreciate that data can be transmitted from the respective exchanges 22, 24 and 26 to the universal exchange 2 via the public telephone system 10.

In accordance with one aspect of the invention, customers can own multiple prepaid telephone calling cards purchased from multiple prepaid telephone carriers; can open multiple accounts with multiple post-paid telephone carriers; or can utilize a mixture of prepaid telephone calling cards and post-paid telephone accounts when making calls through the universal exchange. In this situation, it is desirable, when making a telephone call to a desired destination, to employ the telephone services of the carrier which will charge the least amount of money for that telephone call. It would be inconvenient and time-consuming for the telephone customer to make inquiries with each available carrier to investigate and compare telephone rate schedules to find the respective rates applicable for a call to a desired destination at a particular time of day. [As used herein, the term "available carriers" means the pool of carriers for which the customer either holds prepaid calling cards or has opened telephone service accounts. The preferred embodiment of the invention envisions that the least-cost carrier in the carrier pool for that customer will be automatically determined by a universal exchange. The universal exchange comprises a computer programmed to route each incoming call to the least-cost available carrier, whether prepaid or post-paid.

In accordance with the preferred embodiment of the invention, any party wishing to use the low-cost routing service provided by the universal exchange must participate in an initialization procedure. Preferably, the initialization procedure is carried out by means of a telephone connection between the party wishing to become a customer and the computer or a dedicated processor at the universal exchange. The information gathered during initialization is automatically loaded into memory at the universal exchange. Alternatively, the party wishing to become a customer may interact with a service representative of the universal exchange via a telephone connection or in person. If the universal exchange charges calling parties for its least-cost routing service, then arrangements must be made for payment by the new customer. For example, the universal exchange may open up a new account with the new customer, with bills to be sent to that customer periodically after the service is provided. Alternatively, the universal exchange may require a prepayment, e.g., by means of a charge to a credit card or debit card. Alternatively, the universal exchange may be paid by the carriers. The present invention is not limited to any particular method by which the universal exchange receives payment.

Regardless of whether the new customer receives prompts from a computer or a service representative during the initialization procedure, the new customer must provide a means (e.g., a password or user name or special code) by which the universal exchange can identify that customer. The new customer must also identify all of the participating prepaid carriers from which that customer has purchased or will purchase prepaid calling cards and all of the participating carriers with which that customer has opened post-paid accounts for long-distance or international telephone service. The universal exchange will assign a unique customer identification number to that customer, e.g., in the case of wireless telephones, the MIN can be used as the customer identification number. Preferably, each carrier will be identified by a preassigned carrier code (consisting of one or more digits). In the case of prepaid carriers, the preassigned carrier code may appear on the prepaid calling cards sold by or on behalf of that carrier, so that the customer can simply input the carrier code to the universal exchange via a telephone connection. To complete the initialization process, the universal exchange preferably stores a data table in memory 8 (see FIG. 1) which is addressed by the customer identification number and which contains a list of carrier codes for all of the carriers which are available to the identified customer and have been inputted to the universal exchange by that customer.

In accordance with the preferred embodiment of the invention, the universal exchange is programmed to perform a least-cost routing function for each incoming call from its customers. The algorithm for performing the least-cost routing function comprises the following steps. First, the universal exchange stores the customer identification code and the destination phone number of the incoming call in registers. The computer 6 then retrieves a list of the carrier codes associated with the inputted customer identification code from a data table in memory 8. For the sake of this example, it will be assumed that the calling customer holds prepaid calling cards purchased from carriers X and Z having special exchanges 22 and 26, respectively, and has opened a telephone service account with a long-distance/ international carrier Y having a regular exchange 24. Then the computer 6 retrieves the rate schedule information for the carrier identified by the first carrier code (assume carrier X is listed first) on the list. Preferably the rate schedule information is stored in internal memory of the computer 6. Alternatively, the rate schedule information can be stored in memory 8. Based on the destination indicated by the registered destination phone number and on the rate schedule information for the prepaid carrier X, the computer calculates the cost of a call having a predetermined duration (e.g., 1 minute), assuming that the call were routed through carrier X. The calculated cost for carrier X is stored in a "least-cost" register, while the carrier code for carrier X is stored in a "least-cost provider" register. The computer 6 then calculates the cost of a call having the same predetermined duration, assuming that the call were routed through post-paid carrier Y and using the rate schedule information for carrier Y. The resulting calculated cost for carrier Y is compared to the calculated cost stored in the "least cost" register. If the calculated cost for carrier Y is less than the value retrieved from the "least cost" register, then the calculated cost for carrier Y is stored in the "least cost" register in place of the calculated cost for carrier X. In addition, the carrier code for carrier Y is stored in the "least-cost provider" register in place of the carrier code for carrier X. If the calculated cost for carrier Y is greater than the value retrieved from the "least cost" register, then the computer proceeds to calculate the cost of a call having the same predetermined duration, assuming that the call were routed through prepaid carrier Z and using the rate schedule information for carrier Z. The resulting calculated cost for carrier Z is compared to the calculated cost stored in the "least cost" register. If the calculated cost for carrier Z is less than the value retrieved from the "least cost" register, then the calculated cost for carrier Z is stored in the "least cost" register in place of the current value stored therein. In addition, the carrier code for carrier Z is stored in the "least-cost provider" register in place of the current carrier code stored therein. If the calculated cost for carrier Z is greater than the value retrieved from the "least cost" register, then the computer would repeat the iteration for each additional available carrier until all had been processed. At the end of the foregoing least-cost routing routine, the carrier code currently stored in the "least-cost provider" register will be that carrier determined to be the least-cost provider of the telephone service in question, i.e., the call being placed by the customer to the destination phone number. The computer 6 then sends the appropriate control signals to the telephone switching matrix 4 for routing the call to the exchange of that least-cost carrier.

Preferably the next carrier to be processed by the least-cost routing algorithm is selected at random from the pool of available carriers. If it is determined that the calculated cost for the next carrier is equal to the current least cost stored in the "least cost" register, the carrier code for that next carrier is not substituted for the carrier code stored in the "least-cost provider" register. The random selection of carriers for processing will provide that the least-cost carrier will be selected from a group of equal-cost carriers at random. Any other technique for randomly selecting a least-cost carrier from a group of equal-cost carriers can be used.

In accordance with the preferred embodiment of the invention, each prepaid carrier, once it receives a routed call from the universal exchange, verifies and monitors the incoming call in accordance with the teaching of U.S. Pat. No. 4,706,275. When the amount of credit available to the prepaid customer has been exhausted, the special exchange of the prepaid carrier may either disconnect the call or return the call to the universal exchange. In the latter case, the special exchange sends a warning message to the universal exchange a predetermined amount of time (e.g., 10 seconds) prior to disconnection of the call by the special exchange. In response to the warning message, the universal exchange re-runs the least-cost routing algorithm for the same set of carriers, except that the least-cost prepaid carrier is excluded, and uses that algorithm to determine the second-lowest-cost carrier (prepaid or post-paid). The universal exchange then reroutes the call to the second-lowest-cost carrier. A call can also be re-routed to the second-lowest-cost carrier if the access lines to the exchange of the least-cost carrier are busy. If the second-lowest-cost carrier is a prepaid carrier, then when the available prepaid credit with the second-lowest-cost carrier is exhausted, the foregoing steps can be repeated to re-route the telephone call to a third-lowest-cost carrier and so forth. The universal exchange is preferably equipped with a telephone switching system which is capable of re-routing the telephone call from one carrier to another without interrupting the connection between the calling and called parties. However, if the universal exchange has a telephone switching system without the foregoing capability, then the special exchange of the least-cost prepaid carrier can interpose a first recorded message stating that the caller has a predetermined amount of time (e.g., one minute) remaining before the call will be interrupted. After the first message and before interruption of the call, the special exchange of the least-cost prepaid carrier can interpose a second recorded message asking the calling party to speak a predetermined word, e.g., "just", if he/she wants the call to be re-routed through another carrier. If the calling party speaks the predetermined word, a voice recognition module at the special exchange recognizes that word and initiates a further recorded message instructing the called party to hang up and await a recall. At the same time, the universal exchange is notified that the telephone call needs to be re-routed. When the prepaid airtime is exhausted, the special exchange of the least-cost prepaid carrier returns the call to the universal exchange and the latter then reroutes the call to the second-lowest-cost carrier. Thus the consumer can continue the telephone call without the need to recharge his available balance.

In a further preferred embodiment, after the calling party has been connected to the called party by the least-cost carrier, the universal exchange monitors the quality of the connection, e.g., using packet switching or other technology. If the signal is too weak or the noise is too great, the universal exchange can automatically re-route the call to the second-lowest-cost carrier or any other carrier irrespective of cost.

In accordance with another preferred embodiment, the PIN numbers corresponding to the prepaid carrier codes are communicated by the customer during the initialization procedure. These PIN numbers are stored with the corresponding carrier codes in memory 8 at the universal exchange 2. After the universal exchange performs its least-cost routing routine and a least-cost prepaid carrier has been identified, the universal exchange routes the call to the special exchange corresponding to the least-cost prepaid carrier, along with the corresponding PIN number. Then the special exchange of the least-cost carrier verifies the PIN number and associated available prepaid credit, and routes the call to the station identified by the destination telephone number. Thus the customer need not interact with the special exchange directly, but rather may make a least-cost phone call by simply accessing the universal exchange and inputting his/her customer identification number and the destination telephone number.

In accordance with an alternative preferred embodiment, the verification and monitoring functions of any special exchange may be performed by the universal exchange, which acts as a service bureau for that prepaid carrier. In this case, the customer must also input during initialization the PIN numbers for each prepaid carrier for which the universal exchange is acting as a service bureau. In addition, the PIN number and prepayment amount for each calling card must be received from each prepaid carrier being served by the universal exchange. For example, the universal exchange 2 may interrogate each special exchange 22 and 26 and receive PIN numbers and associated prepayments for each of carriers X and Z via respective dedicated data lines 28. Preferably the universal exchange performs the interrogations at regular intervals, e.g., hourly or daily. Alternatively, the universal exchange may have an arrangement with a particular prepaid carrier that the latter will advise the universal exchange (via a data line) of the PIN number and prepayment amount for each purchased calling promptly after each transaction. That information is stored in memory along with the corresponding carrier codes. In particular, the computer 6 of the universal exchange may construct a database consisting of customer identification codes, the carrier codes associated with each customer identification code, the PIN numbers associated with each carrier code, and the available prepaid balance associated with each PIN number. This database is stored in memory 8. The computer 6 is preferably programmed with a database manager which amends and updates the database on a continuous basis. As part of the database construction process, preferably the computer 6 also verifies that the PIN numbers inputted by the customer for each prepaid carrier are valid, e.g., by matching each PIN number inputted by the customer with a corresponding PIN number provided to the universal exchange by the prepaid carrier.

After the universal exchange 2 identifies a least-cost prepaid carrier from amongst the available carriers (prepaid or post-paid) listed in memory 8 for a particular customer, the universal exchange verifies the available prepayment amount corresponding to the PIN number of the selected prepaid carrier, i.e., the least-cost routing routine excludes as least-cost carrier any carrier for which the available balance is insufficient to cover the initial cost of the telephone call to the station identified by the destination telephone number. If the customer has sufficient available prepaid credit with the selected least-cost prepaid carrier, the universal exchange routes the call to that least-cost prepaid carrier. Once the customer is connected to the station identified by the destination telephone number, the universal exchange can monitor the ongoing telephone call and open the connection when the prepaid balance has been exhausted or fallen below a predetermined threshold.

The foregoing system and method of processing telephone calls will enable the consumer to call any place in the world at the cheapest rate using least-cost routing amongst the different carriers participating with the universal exchange for which each customer holds prepaid telephone calling cards or has opened post-paid accounts for long-distance/international service.

In accordance with an alternative preferred embodiment, known teleconferencing switching equipment can be installed at the universal exchange to enable consumers to use one telephone line to connect multiple parties to make a conference call. The consumer would access the universal exchange and then enter a special code indicating that the customer wishes to make a conference call. That call is then automatically directed to the teleconferencing switching system, which directs the customer to enter the telephone number of each conference participant. Each participant is called separately and then connected into the conference call or placed on held to be connected later. The universal exchange routes each call to each participant through a different exchange which the calling party has an post-paid account or a prepaid balance. All of the called participants are bridged by the teleconferencing switching equipment at the universal exchange to create the conference call. Alternatively, if the customer has multiple PIN numbers with one special exchange, the universal exchange could route multiple calls to multiple participants through that one special exchange, using a different PIN number for each call to a different participant. Similarly, if the customer had multiple post-paid accounts with a single carrier, multiple calls to conference participants could be routed through a single carrier.

While the invention has been described with reference to preferred embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

What is claimed is:

1. A method comprising the steps of:

storing an identification code of a customer and a plurality of carrier codes associated with said identification code in memory accessible by a computer at a call processing platform, each of said plurality of carrier codes identifying a respective one of a plurality of telephone call carriers;

receiving a telephone call from said customer at said call processing platform in response to said customer dialing an access telephone number of said call processing platform from a telephony device;

receiving said customer identification code and a destination telephone number at said call processing platform during said telephone call;

processing said destination telephone number and said plurality of carrier codes corresponding to said customer identification code in said computer in accordance with a plurality of respective rate schedules for said plurality of telephone call carriers and a least-cost routing algorithm to determine a least-cost carrier from said plurality of telephone call carriers for connecting said customer to the station identified by said destination telephone number; and routing said telephone call to an exchange of said least-cost carrier.

2. The method as recited in claim 1, wherein a PIN number is stored for the carrier code of said least-cost carrier, said PIN number identifying a respective prepayment transaction in which said customer had purchased future telephone service to be provided by said least-cost carrier, further comprising the step of transmitting said PIN number to said least-cost carrier in association with said routed telephone call.

3. The method as recited in claim 1, further comprising the steps of:
   receiving a respective rate schedule from each of said plurality of telephone call carriers; and
   storing said respective plurality of rate schedules in said memory.

4. The method as recited in claim 1, further comprising the steps of:
   interrogating each of said plurality of telephone call carriers to obtain said respective plurality of rate schedules; and
   storing said respective plurality of rate schedules in said memory.

5. The method as recited in claim 1, further comprising the steps of:
   receiving from said customer a respective PIN number for each carrier code representing a prepaid carrier, each PIN number identifying a respective prepayment transaction in which said customer had purchased future telephone service to be provided by a respective prepaid carrier;
   receiving a respective available balance for each prepayment transaction from each prepaid carrier; and
   constructing in memory a database comprising said customer identification codes, said plurality of carrier codes, said PIN numbers and said available balances.

6. The method as recited in claim 5, wherein said least-cost routing algorithm comprises the step of excluding as least-cost carrier any carrier for which said respective available balance is insufficient to cover the initial cost of said telephone call to said station identified by said destination telephone number.

7. The method as recited in claim 1, further comprising the steps of:
   receiving from said customer a respective PIN number for each carrier code representing a prepaid carrier, each PIN number identifying a respective prepayment transaction in which said customer had purchased future telephone service to be provided by a respective prepaid carrier;
   interrogating each prepaid carrier to obtain an available balance for each prepayment transaction; and
   constructing in memory a database comprising said customer identification codes, said plurality of carrier codes, said PIN numbers and said available balances.

8. The method as recited in claim 7, wherein said least-cost routing algorithm comprises the step of excluding as least-cost carrier any carrier for which said respective available balance is insufficient to cover the initial cost of said telephone call to said station identified by said destination telephone number.

9. The method as recited in claim 1, further comprising the steps of:
   processing said destination telephone number and said plurality of carrier codes corresponding to said customer identification code in said computer in accordance with said plurality of respective rate schedules for said plurality of telephone call carriers and said least-cost routing algorithm to determine a next least-cost carrier from said plurality of telephone call carriers; and
   routing said telephone call to an exchange of said next least-cost carrier in response to a predetermined message received from said least-cost carrier.

10. A system comprising:
    a telephony device capable of transmitting destination telephone numbers;
    a universal exchange for performing least-cost routing and having an access telephone number; and
    an exchange for routing a telephone call from said telephony device to said universal exchange in response to transmission of said access telephone number by said telephony device;
    wherein said universal exchange comprises:
        memory storing an identification code of a customer and a plurality of carrier codes associated with said identification code, each of said plurality of carrier codes identifying a respective one of a plurality of telephone call carriers;
        a telephone switch for receiving said customer identification code and a destination telephone number from said customer during a telephone call; and
        a processor in communication with said telephone switch and with said memory for processing said destination telephone number and said plurality of carrier codes corresponding to said customer identification code in accordance with a plurality of respective rate schedules for said plurality of telephone call carriers and a least-cost routing algorithm to determine a least-cost carrier from said plurality of telephone call carriers for connecting said customer to the station identified by said destination telephone number,
    wherein said telephone switch routes
    said telephone call to an exchange of said least-cost carrier in response to determination of said least-cost carrier by said processor.

11. The system as recited in claim 10, wherein said memory further stores a PIN number for the carrier code of said least-cost carrier, said PIN number identifying a respective prepayment transaction in which said customer had purchased future telephone service to be provided by said least-cost carrier, further comprising means for transmitting said PIN number to said least-cost carrier in association with said routed telephone call.

12. The system as recited in claim 10, further comprising means for receiving a respective rate schedule from each of said plurality of telephone call carriers, said respective plurality of rate schedules being stored in said memory.

13. The system as recited in claim 12, wherein said receiving means comprise a plurality of data lines respectively connected to said plurality of telephone call carriers.

14. The system as recited in claim 10, further comprising means for interrogating each of said plurality of telephone call carriers to obtain said respective plurality of rate schedules, said respective plurality of rate schedules being stored in said memory.

15. The system as recited in claim 10, wherein said processor further comprises:
    means for acquiring from said customer a respective PIN number for each carrier code representing a prepaid carrier, each PIN number identifying a respective prepayment transaction in which said customer had purchased future telephone service to be provided by a respective prepaid carrier;
    means for acquiring a respective available balance for each prepayment transaction from each prepaid carrier; and
    means for constructing in memory a database comprising said customer identification codes, said plurality of carrier codes, said PIN numbers and said available balances.

16. The system as recited in claim 15, wherein said least-cost routing algorithm comprises means for excluding as least-cost carrier any carrier for which said respective available balance is insufficient to cover the initial cost of said telephone call to said station identified by said destination telephone number.

17. The system as recited in claim 10, wherein said processor further comprises:

means for processing said destination telephone number and said plurality of carrier codes corresponding to said customer identification code in said computer in accordance with said plurality of respective rate schedules for said plurality of telephone call carriers and said least-cost routing algorithm to determine a next least-cost carrier from said plurality of telephone call carriers; and means for controlling said telephone switching matrix to route said telephone call to an exchange of said next least-cost carrier in response to a predetermined message received from said least-cost carrier.

18. A method of routing a telephone call at a call processing platform, comprising the steps of:

storing an identification code of a customer in a database accessible by a computer located at a call processing platform;

storing in said database a respective carrier code for each one of a respective plurality of telephone call carriers to which said customer had made a respective telephone service prepayment;

storing rate schedule information for each of said plurality of telephone call carriers, said rate schedule information being accessible by said computer;

receiving at said call processing platform a telephone call from said customer;

during said telephone call, receiving from said customer said identification code and a destination telephone number identifying a station which said customer wishes to call;

electronically computing which carrier code identifies the least-cost carrier for said call to said station based on said rate schedule information and said destination telephone number; and routing said telephone call from said call processing platform to an exchange of said least-cost carrier.

19. The method as recited in claim 18, wherein a respective PIN number is stored for each of said plurality of telephone service prepayments, further comprising the step of transmitting one of said PIN numbers to said exchange of said least-cost carrier in association with said routed telephone call.

20. The method as recited in claim 18, further comprising the step of interrogating each of said plurality of telephone call carriers to obtain said rate schedule information.

21. The method as recited in claim 18, further comprising the steps of:

storing a respective PIN number for each of said plurality of telephone service prepayments;

storing said plurality of telephone service prepayment amounts; and electronically constructing a database comprising said customer identification code, said plurality of carrier codes, said PIN numbers and said telephone service prepayment amounts.

22. The method as recited in claim 21, further comprising the step of interrogating each of said plurality of telephone call carriers to obtain said telephone service prepayment amounts.

23. The method as recited in claim 21, wherein said electronic computing steps comprises the step of excluding as least-cost carrier any carrier for which the available balance remaining from said respective telephone service prepayment amount is insufficient to cover the initial cost of said telephone call to said station identified by said destination telephone number.

24. The method as recited in claim 18, further comprising the steps of:

electronically computing which carrier code identifies the next least-cost carrier for said call to said station based on said rate schedule information and said destination telephone number; and routing said telephone call to an exchange of said next least-cost carrier in response to a predetermined message received from said exchange of said least-cost carrier.

25. A telephone call processing platform comprising:

an access line having an access telephone number for receiving telephone calls from any telephony device;

memory storing an identification code of a customer, a respective carrier code for each one of a respective plurality of telephone call carriers to which said customer had made a respective telephone service prepayment, and rate schedule information for each of said plurality of telephone call carriers;

means for receiving from said customer, via said access line, said identification code and a destination telephone number identifying a station which said customer wishes to call;

a telephone call router; and a computer programmed to electronically compute which carrier code identifies the least-cost carrier for said call to said station based on said rate schedule information and said destination telephone number; and then control said telephone call router to route said call to an exchange of said least-cost carrier.

26. A telephone system comprising a universal exchange and a plurality of special exchanges coupled to said universal exchange, wherein said universal exchange comprises:

memory storing an identification code of a customer, a respective carrier code for each one of said plurality of special exchanges to which said customer has made a respective telephone service prepayment, and rate schedule information for each of said plurality of telephone call carriers;

means for receiving an identification code and a destination telephone number identifying a station which said customer wishes to call from said customer;

a telephone switching matrix; and a computer programmed to electronically compute which carrier code identifies a least-cost special exchange for routing said call to said station based on said rate schedule information and said destination telephone number, and then control said telephone switching matrix of said universal exchange to route said call to said least-cost special exchange, and wherein each of said special exchanges comprises:

memory storing a PIN number and an available prepayment amount associated with said customer;

means for receiving said PIN number from said customer;

means for receiving said destination telephone number from said universal exchange;

a telephone switching matrix; and a computer programmed to electronically verify that said PIN number is valid and that said available prepayment amount is sufficient to cover the initial cost of said call to said station, and then control said telephone switching matrix of said special exchange to route said call to said station.

27. A telephone system comprising a universal exchange and a plurality of special exchanges coupled to said universal exchange, wherein said universal exchange comprises:

memory storing an identification code of a customer, a respective carrier code for each one of said plurality of special exchanges to which said customer has made a respective telephone service prepayment, a respective PIN number for each of said plurality of telephone service prepayments, and rate schedule information for each of said plurality of telephone call carriers;

means for receiving identification code and a destination telephone number identifying a station which said customer wishes to call from said customer;

a telephone switching matrix; and a computer programmed to electronically compute which carrier code identifies a least-cost special exchange for routing said call to said station based on said rate schedule information and said destination telephone number, control said telephone switching matrix of said universal exchange to route said call to said least-cost special exchange, and transmit one of said PIN numbers to said least-cost special exchange, and wherein each of said special exchanges comprises:
memory storing a respective one of said PIN numbers and a respective available prepayment amount associated with said customer;

means for receiving said PIN number and said destination telephone number from said universal exchange;

a telephone switching matrix; and a computer programmed to electronically verify that said PIN number is valid and that said available prepayment amount is sufficient to cover the initial cost of said call to said station, and then control said telephone switching matrix of said special exchange to route said call to said station.

28. A method of making a telephone call, comprising the steps of:

prepaying for telephone services to be provided by a plurality of special carriers;

storing at a universal exchange a respective carrier code for each one of a respective plurality of telephone call carriers to which said customer had made a respective telephone service prepayment;

acquiring rate schedule information for each of said plurality of telephone call carriers;

accessing said universal exchange from a remote location;

transmitting a customer identification code and a destination telephone number from said remote location to said universal exchange, said destination telephone number identifying a station which a customer wishes to call;

electronically computing which carrier code identifies the least-cost carrier for said call to said station based on said rate schedule information and said destination telephone number;

routing said call from said universal exchange to a special exchange of said least-cost carrier;

transmitting a PIN number to said special exchange;

electronically verifying that said PIN number is valid and that said available prepayment amount is sufficient to cover the initial cost of said call to said station; and routing said call from said special exchange to said station.

29. A method of making a telephone call, comprising the steps of:

prepaying for telephone services to be provided by a plurality of special carriers;

storing at a universal exchange a respective carrier code for each one of a respective plurality of telephone call carriers to which said customer had made a respective telephone service prepayment and a respective PIN number;

acquiring rate schedule information for each of said plurality of telephone call carriers;

accessing said universal exchange from a remote location;

transmitting a customer identification code and a destination telephone number from said remote location to said universal exchange, said destination telephone number identifying a station which a customer wishes to call;

electronically computing which carrier code identifies the least-cost carrier for said call to said station based on said rate schedule information and said destination telephone number;

electronically verifying that said PIN number is valid and that said available prepayment amount is sufficient to cover the initial cost of said call to said station if routed through a special exchange of said low-cost carrier; and routing said call from said universal exchange to said special exchange of said least-cost carrier; and routing said call from said special exchange to said station.

30. A system comprising:

a telephony device capable of transmitting destination telephone numbers;

a universal exchange for performing least-cost routing and having an access telephone number; and an exchange for routing a telephone call from said telephony device to said universal exchange in response to transmission of said access telephone number by said telephony device;

wherein said universal exchange comprises:
memory storing an identification code of a customer and a plurality of carrier codes associated with said identification code, each of said plurality of carrier codes identifying a respective one of a plurality of telephone call carriers;

an input communication channel for receiving said customer identification code and a destination telephone number from said customer during said telephone call;

a processor in communication with said input communication channel and with said memory for processing said destination telephone number and said plurality of carrier codes corresponding to said customer identification code in accordance with a plurality of respective rate schedules for said plurality of telephone call carriers and a least-cost routing algorithm to determine a least-cost carrier from said plurality of telephone call carriers for connecting said customer to the station identified by said destination telephone number; and means for routing said telephone call to an exchange of said least-cost carrier in response to determination of said least-cost carrier by said processor.

31. A method for routing a prepaid telephone call comprising the steps of:
   receiving a telephone call from a customer who has purchased prepaid airtime from a plurality of prepaid carriers;
   determining which one of said plurality of prepaid carriers is the least-cost prepaid carrier for said telephone call;
   routing said telephone call to said least-cost prepaid carrier;
   receiving a message from said least-cost prepaid carrier indicating that the prepaid airtime purchased from said least-cost prepaid carrier by said customer is exhausted or nearly exhausted; and
   re-routing said telephone call to one of said plurality of prepaid carriers other than said least-cost prepaid carrier in response to receipt of said message.

32. The method as recited in claim 31, further comprising the step of determining which one of said plurality of prepaid carriers is the second-lowest-cost prepaid carrier for said telephone call, wherein said telephone call is re-routed to said second-lowest-cost carrier.

33. A system for routing a prepaid telephone call comprising:
   an access line for receiving a telephone call from a customer who has purchased prepaid airtime from a plurality of prepaid carriers;
   means for determining which one of said plurality of prepaid carriers is the least-cost prepaid carrier for said telephone call;
   means for routing said telephone call to said least-cost prepaid carrier;
   a communications channel for receiving a message from said least-cost prepaid carrier indicating that the prepaid airtime purchased from said least-cost prepaid carrier by said customer is exhausted or nearly exhausted; and
   means for re-routing said telephone call to one of said plurality of prepaid carriers other than said least-cost prepaid carrier in response to receipt of said message.

34. The system as recited in claim 31, further comprising means for determining which one of said plurality of prepaid carriers is the second-lowest-cost prepaid carrier for said telephone call, wherein said telephone call is re-routed to said second-lowest-cost carrier by said re-routing means.

35. A method for routing a telephone call comprising the steps of:
   receiving a telephone call from a person who is a customer of a multiplicity of long-distance/international carriers;
   determining which one of said of long-distance/international carriers is the least-cost carrier for said telephone call;
   routing said telephone call to said least-cost carrier;
   receiving a busy signal from said least-cost carrier; and
   re-routing said telephone call to one of said plurality of long-distance/international carriers other than said least-cost carrier in response to receipt of said busy signal.

36. The method as recited in claim 35, further comprising the step of determining which one of said plurality of long-distance/international carriers is the second-lowest-cost carrier for said telephone call, wherein said telephone call is re-routed to said second-lowest-cost carrier.

37. A system for routing a telephone call comprising:
   an access line for receiving a telephone call from a person who is a customer of a multiplicity of long-distance/international carriers;
   means for determining which one of said plurality of long-distance/international carriers is the least-cost carrier for said telephone call;
   means for routing said telephone call to said least-cost carrier;
   means for detecting a busy signal from said least-cost carrier; and
   means for re-routing said telephone call to one of said plurality of long-distance/international carriers other than said least-cost carrier in response to receipt of said busy signal.

38. The system as recited in claim 37, further comprising means for determining which one of said plurality of long-distance/international carriers is the second-lowest-cost carrier for said telephone call, wherein said telephone call is re-routed to said second-lowest-cost carrier by said re-routing means.

39. A method for routing a telephone call comprising the steps of:
   receiving a telephone call from a person who is a customer of a multiplicity of long-distance/international carriers;
   determining which one of said of long-distance/international carriers is the least-cost carrier for said telephone call;
   routing said telephone call to said least-cost carrier;
   monitoring the quality of the voice signal during said telephone call routed to said least-cost carrier; and
   re-routing said telephone call to one of said plurality of long-distance/international carriers other than said least-cost carrier in response to detection of poor quality.

40. The method as recited in claim 39, further comprising the step of determining which one of said plurality of long-distance/international carriers is the second-lowest-cost carrier for said telephone call, wherein said telephone call is re-routed to said second-lowest-cost carrier.

41. A system for routing a telephone call comprising:
   an access line for receiving a telephone call from a person who is a customer of a multiplicity of long-distance/international carriers;
   means for determining which one of said plurality of long-distance/international carriers is the least-cost carrier for said telephone call;
   means for routing said telephone call to said least-cost carrier;
   means for monitoring the quality of the voice signal during said telephone call routed to said least-cost carrier; and
   means for re-routing said telephone call to one of said plurality of long-distance/international carriers other than said least-cost carrier in response to detection of poor quality.

42. The system as recited in claim 41, further comprising means for determining which one of said plurality of long-distance/international carriers is the second-lowest-cost carrier for said telephone call, wherein said telephone call is re-routed to said second-lowest-cost carrier by said re-routing means.

43. A system for connecting a conference call at a universal exchange, comprising the steps of:

receiving a telephone call at said universal exchange from a person who is a customer of first and second carriers and wishes to make a conference call;

routing a first call to a first exchange of said first carrier for connecting a first participant to said conference call; and routing a second call to a second exchange of said second carrier for concurrently connecting a second participant to said conference call.

44. A system for connecting a conference call at a universal exchange, comprising the steps of:

receiving a telephone call at said universal exchange from a person who has purchased first and second PIN numbers from a prepaid carrier and wishes to make a conference call;

routing a first call to a special exchange of said prepaid carrier using said first PIN number for connecting a first participant to said conference call; and routing a second call to said special exchange of said prepaid carrier using said second PIN number for concurrently connecting a second participant to said conference call.

45. A method for routing a telephone call, comprising the steps of:

storing an identification code for a calling party and a multiplicity of carrier codes in a database, each one of said multiplicity of carrier codes corresponding to a respective one of a multiplicity of carriers, said carrier codes being associated with said identification code in said database;

answering a telephone call from said calling party;

receiving said identification code and a destination telephone number via said telephone call;

retrieving each carrier code associated with said identification code from said database;

determining which one of said multiplicity of carriers identified by said retrieved carrier codes is the least-cost carrier for connecting said telephone call to a station identified by said destination telephone number; and routing said telephone call to said least-cost carrier.

46. A system for routing a telephone call, comprising the steps of:

a database storing an identification code for a calling party and a multiplicity of carrier codes, each one of said multiplicity of carrier codes corresponding to a respective one of a multiplicity of carriers, said carrier codes being associated with said identification code in said database;

an access line for receiving a telephone call from said calling party; and a universal exchange programmed to perform the following steps:

receiving said identification code and a destination telephone number via said access line while said telephone call is connected;

retrieving each carrier code associated with said identification code from said database;

determining which one of said multiplicity of carriers identified by said retrieved carrier codes is the least-cost carrier for connecting said telephone call to a station identified by said destination telephone number; and routing said telephone call to said least-cost carrier.

47. A system for routing a telephone call comprising:

a universal exchange having an access telephone number; and a regular exchange programmed to connect a telephony device to said universal exchange in response to initiation of a telephone call to said access telephone number by a calling party employing said telephony device, wherein said universal exchange is programmed to route said telephone call to a least-cost carrier selected from a list of carriers and comprises:

a database storing a respective identification code for each of a multiplicity of customers and a respective set of carrier codes, each carrier code identifying a respective one of a multiplicity of carriers, each set of carrier codes being associated with a respective identification code in said database;

a telephone switching system for receiving telephone calls directed thereto by said regular exchange; and a call processor connected to said telephone switching system for processing identification codes and destination telephone numbers received from calling parties with reference to said database, wherein said call processor is programmed to perform the following steps:

determining which one of a multiplicity of carriers is the least-cost prepaid carrier for a telephone call from a particular customer identified by an identification code in said database, said least-cost carrier being selected from the carriers identified by the multiplicity of carrier codes associated with the identification code of said particular customer in said database; and routing said telephone call to said least-cost carrier via said telephone switching system.

48. The system as recited in claim 47, wherein said regular exchange is a land-line exchange.

49. The system as recited in claim 47, wherein said regular exchange is a wireless exchange.

50. The system as recited in claim 47, wherein said regular exchange is an Internet exchange.

51. A method for making a telephone call, comprising the steps of:

storing an identification code for a calling party and a multiplicity of carrier codes in a database, each one of said multiplicity of carrier codes corresponding to a respective one of a multiplicity of carriers, said carrier codes being associated with said identification code in said database;

dialing an access telephone number using a telephony device;

connecting said telephony device to a universal exchange identified by said access telephone number via a regular exchange;

transmitting an identification code and a destination telephone number from said telephony device to said universal exchange during said connection;

retrieving each carrier code associated with said identification code from said database in response to receipt of said identification code and said destination telephone number at said universal exchange;

determining which one of said multiplicity of carriers identified by said retrieved carrier codes is the least-cost carrier for connecting said telephone call to a station identified by said destination telephone number; and routing said telephone call from said universal exchange to said least-cost carrier.

52. The method as recited in claim 51, wherein said transmitting step is initiated by touching an input device on a wireless telephone.

53. The method as recited in claim 52, wherein said identification code is a mobile identification number for a wireless telephone.

54. The method as recited in claim 52, further comprising the steps of:

transmitting a PIN number taken from a prepaid calling card from said telephony device to said universal exchange during said connection; and verifying that said PIN number is valid and that a prepaid account balance associated with said PIN number is sufficient to cover an initial cost of said telephone call to said station identified by said destination telephone number.

55. A method of making wireless telephone calls, comprising the steps of:

obtaining a wireless telephone from a wireless carrier;

opening an account entitling a customer having a special code to receive least-cost routing service from a universal exchange;

storing said special code and a plurality of carrier codes associated with said special code in a database;

operating said wireless telephone to cause said wireless telephone to transmit signals representing said special code and a destination telephone number;

receiving said transmitted signals at a distance from said wireless telephone;

routing said received special code and destination phone number to said universal exchange;

determining at said universal exchange that said special code is valid for obtaining least-cost routing service;

determining, at said universal exchange, which one of a multiplicity of carriers having a carrier code associated with said special code in said database is the least-cost carrier for connecting said telephone call to a station identified by said destination telephone number; and routing said telephone call from said universal exchange to said least-cost carrier.

56. A system for connecting a telephone call from a calling party using a wireless telephone to a called party using a telephone, comprising:

a universal exchange having an access number; and a wireless exchange programmed to connect a wireless telephone to said universal exchange in response to said calling party dialing said access number using said wireless telephone, wherein said universal exchange is programmed to route said telephone call from said wireless telephone to a least-cost carrier selected from a list of carriers and comprises a database containing a mobile identification number of said wireless telephone and a plurality of carrier codes associated with said mobile identification number, each of said carrier codes identifying a respective one of said carriers on said list.

57. A method for making a telephone call, comprising the steps of:

receiving from a customer the identities of a multiplicity of carriers with whom said customer wishes to receive long-distance telephone service from;

storing an identification code for said customer and a multiplicity of carrier codes in a database accessible by a universal exchange, each one of said multiplicity of carrier codes corresponding to a respective one of said multiplicity of carriers identified by said customer, said carrier codes being associated with said identification code in said database;

connecting a telephony device being used by said customer to said universal exchange;

transmitting a destination telephone number from said telephony device to said universal exchange during said connection;

determining said identification code of said customer at said universal exchange;

retrieving each carrier code associated with said identification code from said database;

determining which one of said multiplicity of carriers identified by said retrieved carrier codes is the least-cost carrier for connecting said telephone call to a station identified by said destination telephone number; and routing said telephone call from said universal exchange to said least-cost carrier.

* * * * *

Disclaimer

6,381,315 B1 — Eli Nhaissi, Westbury, NY. UNIVERSAL EXCHANGE FOR MAKING LEAST-COST NON-LOCAL TELEPHONE CALLS. Patent dated Apr. 30, 2002. Disclaimer filed March 16, 2005, by the inventor.

Hereby enters this disclaimer to claims 35-42 of said patent.

*(Official Gazette May 17, 2005)*